Aug. 31, 1965     F. B. WOESTEMEYER     3,203,256
ACCELERATION RESPONSIVE DEVICE
Filed April 24, 1956
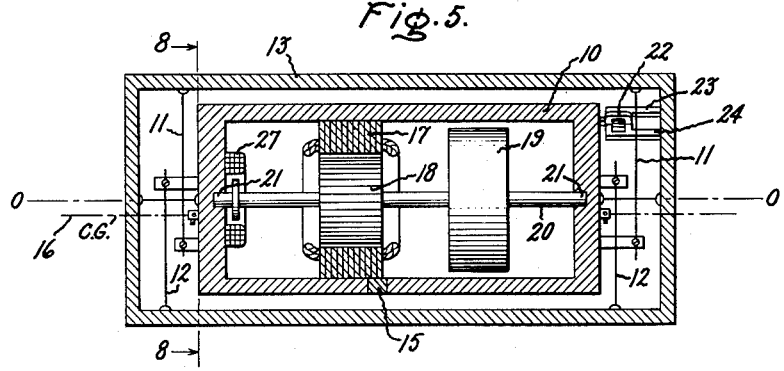
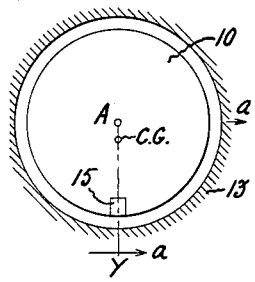 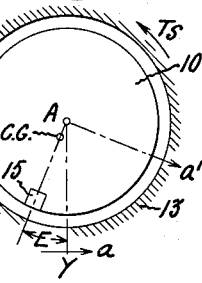 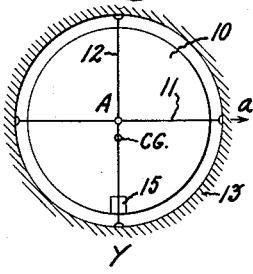 
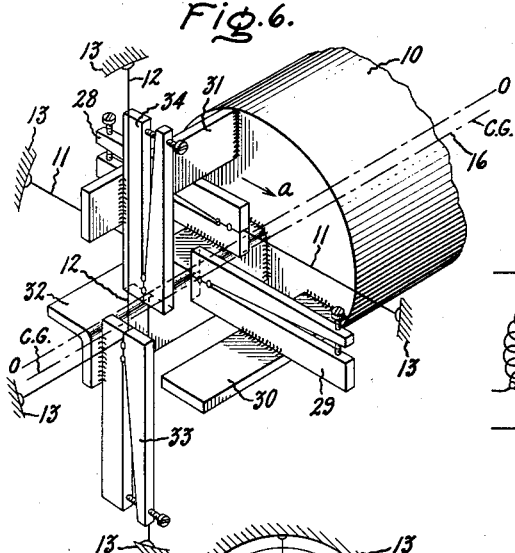 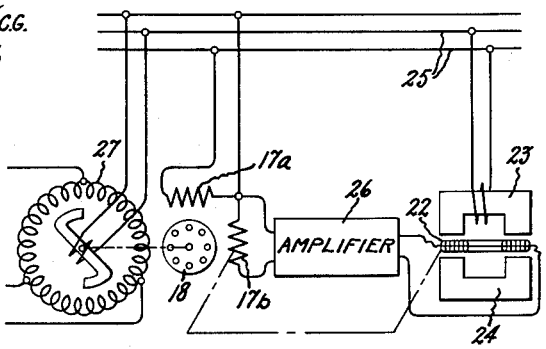
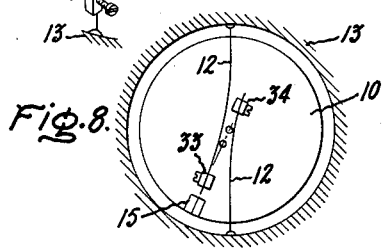
Inventor:
Francis B. Woestemeyer,
by Alfred B. Levine
His Attorney.

United States Patent Office 3,203,256
Patented Aug. 31, 1965

3,203,256
ACCELERATION RESPONSIVE DEVICE
Francis B. Woestemeyer, Schenectady, N.Y., assignor to General Electric Company, a corporation of New York
Filed Apr. 24, 1956, Ser. No. 580,261
8 Claims. (Cl. 73—517)

This invention generally relates to acceleration responsive devices having rotatably mounted acceleration responsive elements, and more particularly to such devices in which the element is controlled to be responsive only to desired accelerations and insensitive to others.

The present invention pertains to changes in acceleration responsive devices of the type having an acceleration responsive element rotatably mounted; such as is disclosed in a copending application of Frithiof V. Johnson, entitled "Acceleration Responsive Device," Serial No. 459,909, filed October 4, 1954, now Patent No. 2,942,475, and assigned to the same assignee as the present invention.

In this Johnson application, which is discussed herein for background purposes, there is provided an acceleration responsive device having an acceleration responsive element pivotally mounted for free rotation, and having an unbalanced mass eccentrically mounted on the element so as to unbalance the element and enable a rotative torque to be imparted thereto in response to certain linear accelerations with resulting angular movement of the unbalanced element. A servo system responsive to this angular movement imparts a counter-torque thereto tending to restore the element to its original position. When devices of this type are mounted in vehicles, they are, on occasion, subject to error caused by the shifting of the sensitive axis of the unbalanced element away from the direction in which it is desired to measure accelerations. Thus, as may be seen by reference to FIG. 1 of the drawings, showing a diagrammatic end view of such a device if the acceleration desired to be measured is in the direction "a," accelerations in a direction perpendicular to this desired direction, e.g. along axis AY, have no effect upon the device before rotation of the element 10 since they act upon the center of gravity, labeled C.G., of the unbalanced element 10. However, as shown by FIG. 2, when the rotatable element 10, rotates in a clockwise direction through the small angle "E" there is an accompanying shift in the sensitive axis of the device to "a." This occurs since rotation of the element 10 changes the position of the unbalanced mass 15, moving the center of gravity C.G. of the element in a clockwise direction. As a result the rotatable element 10 is sensitive to unwanted lateral accelerations, acting along the axis AY, which may introduce an error into the measurement of acceleration in the "a" direction. A servo system of the simple type currently used can never reduce the angle "E" to O by a restoring torque "Ts" since the servo system requires an existing error signal to produce the counter torque and this error signal is generated as a result of the displacement "E."

To eliminate this difficulty in accordance with the present invention, the customary single shaft upon which the element 10 is normally mounted for rotation within its housing is eliminated and replaced by a unique means suspending the element 10 in two transverse geometric planes. The first plane of suspension is selected to include the chosen rotative axis of the element and the desired direction "a" (FIG. 3) and the second plane of suspension is selected to be transverse to the first plane and to include the center of gravity axis of the element (in the direction AY FIG. 3). With this arrangement as shown by FIGS. 3 and 4, accelerations in the "a" direction cause the rotatable element 10 to rotate clockwise through an angle "E," as before, but any lateral acceleration forces (in a direction AY) are transmitted to the rotatable element 10 through its center of gravity point and consequently produce no turning torque upon the rotatable element 10 either before or after rotation of the element 10 from its null position, all as best shown by FIG. 4.

Thus, an object of the present invention is to provide an acceleration responsive device in which the responsive device is controlled so that it is responsive only to desired accelerations in a given direction.

Additional features, advantages, and objects of this invention will become apparent upon a detailed consideration of the following description taken in connection with the single sheet of drawings wherein:

FIGS. 1 and 2 are diagrammatic illustrations depicting the shifting of the sensitive axis of known accelerometers when the present invention is not used, FIGS. 3 and 4 are diagrammatic illustrations depicting one preferred manner of preventing the shift of the sensitive axis in accordance with the present invention, FIG. 5 is a sectional view in side elevation generally illustrating one preferred embodiment of the invention, FIG. 6 is an enlarged perspective view, partially in section, for illustrating in greater detail a preferred manner of supporting the acceleration responsive element of FIG. 5, FIG. 7 is a schematic circuit diagram illustrating the operation of the electrical components of FIG. 5, and FIG. 8 is a diagrammatic view illustrating the operation of the preferred suspending means shown by FIG. 6.

Referring now to FIG. 5 for a detailed consideration of one embodiment of the invention, an acceleration responsive device is provided comprising an acceleration responsive element freely pivoted for rotation about an axis 0—0. This element is preferably in the form of a cylindrically shaped hollow container 10 pivotally mounted at its ends, by means of the pairs of wires 11 and 12 under tension, for rotation about a given axis 0—0. These supporting wires are connected to the inside of an enclosed hollow cylindrical housing 13 which is preferably fixed with respect to the member whose acceleration is to be measured (not shown).

An unbalanced mass 15 is eccentrically carried by the acceleration responsive element 10 and is adapted to change its position in response to accelerations to which the device is subjected in a direction perpendicular to the plane of the FIG. 5 or the sheet of drawing. In the illustrated embodiment, this unbalanced mass is preferably in the form of a weighted plug or the like 15 mounted eccentrically in the container 10 and serving to make the center of gravity axis 16 of the container 10 displaced from its axis of rotation 0—0, as shown.

Restoring means are provided responsive to the rotation of element 10 for imparting a counter-torque to the element 10 to restore it to its original position. This means in the illustrated embodiment is in the form of a closed loop servo system including an electric motor mounted within the container 10, having a stator 17 affixed to the container 10, a rotor 18, and a flywheel 19 mounted on the rotor shaft 20. The shaft 20 is mounted for rotation by bearings preferably in the form of journals 21 provided within the container 10. This motor and flywheel restoring means is energized in response to the degree and direction of rotation of the container 10 within its enclosure 13, which energization is provided by a suitable electromagnetic pickoff coil 22 connected to rotate with the element 10 and generating a voltage as it passes through an electromagnetic field generated by the field poles 23 and 24 which are suitably connected inside of the housing 13, as shown.

As best shown by the electrical circuit FIG. 7, rotation of the element 10 within cylinder 13 causes the pickoff coil 22 to move in the space between the field poles 23 and 24 which are energized by the power source 25. This generates a signal in the pickoff coil 22 which is transmitted to an amplifier 26 energizing the stator windings 17a and 17b to drive the motor rotor 18. Flexible connectors of a suitable nature (not shown) are used to transmit power and signals between the container 10 and the housing 13 in accordance with the circuit shown by FIG. 7. This signal applied to the motor windings 17a and 17b so drives rotor 18 that the rotation of rotor 18 and flywheel 19 is in the same direction as the torque imparted to the element 10 by the acceleration being measured, whereby the reaction torque or stator 18 is in the opposite direction, acting to return the container to its original and null position.

The angular acceleration of the rotor 18 and the flywheel 19 is, therefore, proportional to the linear acceleration to which the device is subject as is more fully described in the above-mentioned Johnson application. Thus, since this motor rotor 18 drives a suitable electrical pickoff, generally designated 27, as shown in FIGS. 5 and 7, the signal generated by this electrical pickoff 27 over its output line is, therefore, proportional to the double integral of the acceleration acting upon the housing or the distance traveled during the acceleration as is more fully described in the above Johnson application.

In accordance with the present invention, improved means are provided for suspending the rotatable element 10 within its housing 13 enabling this element to be responsive to accelerations only along the desired "a" axis but to be relatively insensitive to accelerations transverse thereto or along the axis AY (FIGS. 1–4 incl.). One preferred form of these means, as best shown by the enlarged perspective of FIG. 6, comprises supporting movable element 10 along the desired acceleration responsive axis by a pair of wires 11 under tension, and supporting movable element in its transverse or up and down axis by a separate second pair of wires 12. As best shown by FIGS. 3 and 4, and FIGS. 6, suitable clamping means 28 and 29, affixed to container 10, are adapted to grip one end of each of the wires 11, whose opposite ends are suitably attached and to portions of the support 13. These clamping means 28 and 29 are preferably mounted upon outstanding bar-like members 30 and 31, respectively, projecting from each end of the rotatable cylindrical element 10. These clamping means 29 and 28 are so positioned at the ends of the cylinder 10 as to enable each of the wires 11 held thereby to pass through the normal rotative axis 0—0 of the member 10 thereby supporting element 10 in the "a" direction by means of these wires 11 under tension.

Additionally, mounted on projecting bars or suitable extensions 31 and 32 projecting from the end of cylinder 10 are two upright clamping means 33 and 34 adapted to grip and hold under tension the ends of the second pair of wires 12, the other ends of which are also connected to housing 13. These clamping means are so positioned with respect to element 10 that the wires 12 pass through a different longitudinal axis 16, (FIGS. 5 and 6) of the element 10 which is the axis of the center of gravity of the element 10, as shown in FIG. 5.

With this arrangement, as is best shown by the diagrammatic representations of FIGS. 3 and 4, all forces transmitted to the element 10 along the "a" direction are transmitted by means of the supporting wires 11 and all forces transmitted to the element 10 in the transverse or AY direction are transmitted thereto by means of the wires 12. Consequently any accelerations of the housing 13 in the "a" direction tend to cause clockwise rotation of the element 10 as shown, but any accelerations in the transverse or AY direction, being transmitted along an axis through the center of gravity of the element 10, produce no turning torque upon the element 10 irrespective of whether element 10 is in its null rotative position or has been displaced therefrom as shown by FIG. 4.

As shown by FIG. 8, a certain amount of bending of the supporting wires 11 and 12 takes place as the element 10 is rotated. However, by suitably selecting the wires and positioning the clamping devices, as shown, the net effect of this bending is compensated such that element is effectively suspended in the manner illustrated by FIGS. 3 and 4.

While a particular embodiment of this invention has been illustrated and described, it is evident that many modifications thereof will readily occur to those skilled in the art. It should be understood, therefore, that the invention is not to be considered as being limited to the particular arrangement disclosed but only in accordance with the following claims appended hereto.

What is claimed is:

1. In an acceleration responsive device, a housing, a rotatable body within said housing, means interconnecting said rotatable body and housing to enable said body to rotate within said housing about a given axis offset from the center-of-gravity axis of said body, said means including a first mounting means supporting said body in one geometrical plane including said rotative axis and a second mounting means supporting said body in a second geometrical plane perpendicular to said first plane and including said center of gravity axis, whereby said member may rotate in response to acceleration of said housing in the direction of said first geometric plane but is insensitive to accelerations in the direction of said second geometric plane.

2. In the device of claim 1, said first and second mounting means each including a flexible member interconnecting said body and housing.

3. In an acceleration responsive device, a housing a sealed container mounted for rotation about a given axis within said housing, said container having a center of gravity axis displaced from said given axis whereby a first rotative torque is normally imparted to the container in response to linear acceleration of the housing in a direction perpendicular to said given axis, an electric motor within said container including a stator secured to the container and a rotor driving a flywheel, pick-off means for producing a signal in response to movement of the container, circuit means for applying said signal to the motor to impart a counter torque to the container, means for obtaining a signal proportional to the rotation of said flywheel, said mounting means for enabling rotation between said container and housing including a first flexible member interconnecting said container with said housing in a first geometric plane including said given axis and second flexible means interconnecting said container and housing in a second geometrical plane transverse to said first geometrical plane and including said center of gravity axis and said container.

4. In an acceleration responsive device, a housing, a rotatable body within said housing, means for mounting said body to rotate within said housing about a given axis offset from the center-of-gravity axis of said body, said means including a first mounting means supporting said body in one geometrical plane including said rotative axis and a second mounting means supporting said body in a second geometrical plane perpendicular to said first plane and including said center of gravity axis, whereby said member may rotate in response to acceleration of said housing in the direction of said first geometric plane but is insensitive to accelerations in the direction of said second geometric plane, said first and second mounting means including a pair of flexible members interconnecting said housing and container.

5. In an acceleration responsive device, a hollow housing, a hollow symmetrically formed body within said housing, means for rotatably mounting said body within said housing about a given axis passing through the geometrical center of said body, an eccentric weight supported by said body to displace the center of gravity axis of said body from said given axis, means within said body responsive to relative rotation of said body and housing from a given position to generate a rotative torque to said body to return it to said given position, said means rotatably mounting said body including a first mounting means supporting said body in a first geometrical plane including said rotative axis and a second mounting means supporting said body in a second geometrical plane perpendicular to said first plane and including said center of gravity axis.

6. In the device of claim 5, said first and second mounting means each including a flexible member interconnecting said body and housing.

7. In an acceleration responsive device, a housing, a rotatable body within said housing adapted to rotate about a given axis, first and second pairs of flexible wires interconnecting said body and housing and being positioned in a first geometrical plane including said given axis, an eccentric weight supported by said body to displace the center-of-gravity axis of said body from said given axis, and third and fourth pairs of flexible wires interconnecting said body and housing and being positioned in a second geometrical plane perpendicular to said first plane and including said center-of-gravity axis.

8. In an acceleration responsive device, a support, a cylindrical, hollow member rotatably mounted upon said support to rotate about the central axis of said cylindrical member, said member being eccentrically weighted and having an axis containing its center-of-gravity displaced from said given axis, said rotatable mounting including a first and second pair of flexible wires interconnecting said member and support and being positioned in a first geometrical plane and including said given axis, and including third and fourth pairs of flexible wires interconnecting said member and support and being positioned in a second geometrical plane transverse to said first plane and including said axis containing the center of gravity of said member.

References Cited by the Examiner

UNITED STATES PATENTS 2,672,334  3/54  Chenery _____ 264—1

RICHARD C. QUEISSER, *Primary Examiner.*

SAMUEL FEINBERG, JAMES J. GILL, *Examiners.*